United States Patent Office 3,470,144
Patented Sept. 30, 1969

3,470,144
PROCESS FOR PRODUCING COPOLYMER
Saburo Minekawa, Yokohama, Koretaka Yamaguchi, Kawasaki-shi, and Kuniaki Sakamoto, Tokyo, Japan, assignors to Asahi Kasei Kogyo Kabushiki Kaisha, Osaka, Japan, a corporation of Japan
No Drawing. Filed Dec. 15, 1966, Ser. No. 601,836
Claims priority, application Japan, Dec. 21, 1965, 40/78,371
Int. Cl. C08f 3/04, 1/14
U.S. Cl. 260—85.3        8 Claims

ABSTRACT OF THE DISCLOSURE

A process for producing a curable rubbery copolymer containing substantially no gel insoluble in hydrocarbons, the process comprising copolymerizing 1,3-butadiene and propylene with a ternary catalyst consisting of a trialkylaluminum, iodine and a titanium compound having the formula: $TiBr_nCl_{4-n}$ wherein $n$ is an integer from 0 to 4.

---

The present invention relates to a process for producing a copolymer of 1,3-butadiene and propylene.

Some attempts at obtaining copolymers of 1,3-butadiene and propylene have been made. Generally, the copolymerizability of propylene with 1,3-butadiene is poor. Accordingly, it is difficult to obtain a copolymer with high content of propylene. Thus, the obtained copolymer contains a large amount of insoluble gel. In order to practically produce such a copolymer, one confronts numerous difficulties.

For example, according to the method of Belgian Patent 627,996, a catalyst solution prepared by mixing a trialkyl-aluminum with titanium tetrachloride in the presence of propylene is introduced to propylene and butadiene so as to obtain the desired copolymer of high propylene content. The butadiene-propylene copolymer thus obtained contains 20–50% of substances insoluble in benzene. In case of its use as a synthetic rubber, its mixing property with a filler is inferior, and further it has deleterious effect on the properties of matter of cured stock, especially tensile strength, abrasion resistance, etc.

According to the method of British Patent 924,654, a propylene-butadiene-copolymer is obtained in the presence of the so-called alfin catalyst consisting of an alkali metal alkenyl, an alkali metal alkoxide, and an alkali metal halide. The thus obtained propylene-butadiene copolymer has a molecular weight of about 5,000,000 to 40,000,000 and does not have very good processing properties. Particularly, it lacks rubber elasticity since the microstructure of the butadiene unit of this copolymer is almost all trans-1,4 configuration. Therefore it is useful only for golf balls, plastic blends and the like.

Generally, in the case of copolymerization of 1,3-butadiene and propylene by use of a catalyst to obtain the respective polymer, only homopolybutadiene is obtained since the reactivities of both monomers are very different. Even if copolymerization occurs, only a copolymer with an extremely low content of propylene is produced. Sometimes a block copolymer is produced and this cannot be employed as a rubber for general purposes. Namely a process for producing a copolymer of 1,3-butadiene and propylene with high propylene content has not yet been found. Accordingly, same has not been synthesized for practical use.

The object of the present invention is to produce a copolymerization rubber of butadiene-propylene of high molecular weight with high propylene content which does not contain an insoluble gel in the solvent.

A further object is to provide a rubber compound having excellent practical properties of matter as a raw material of rubber for practical use.

The objects of the present invention have been accomplished by the following method. Namely, it is a copolymerization method by use of a complex catalyst consisting of three components, that is, (A) the mixture of one or more trialkylaluminums, (B) iodine and (C) a mixture of at least one titanium compound of the formula: $TiBr_nCl_{4-n}$, wherein $n$ is an integer of 0 to 4. The amounts of components (A), (B) and (C) are in the range limited as shown in the following:

(1) Molar ratio Al/Ti=1.0 to 4.0
(2) Molar ratio $I_2$/Ti=0.5 to 2.0
(3) $TiBr_nCl_{4-n}$=0.5 millimole to 15 millimoles per 100 g. of the monomer mixture of 1,3-butadiene and propylene.

According to the process of the present invention, the copolymerization of propylene and 1,3-butadiene is excellent and there is obtained a copolymer of high molecular weight having no gel substance insoluble in the solvent. The thus obtained copolymer is suitable for practical use as a synthetic rubber. The synthetic rubber produced according to the process of the present invention has a carbon-carbon double bond due to the 1,3-butadiene in the molecule. Therefore, the conventional vulcanization is easy and further, the operating properties in an open roll, Banbury mixer and the like, processing properties such as extrusion in an extruder, tensile strength, tear resistance and abrasion resistance of the cured rubber are all excellent. It can be utilized on a wide scope.

The alkyl group of the trialkylaluminum component of the polymerization catalyst has 1 to 10 carbon atoms, preferably 1 to 4 carbon atoms. For example, they include trimethylaluminum, triethylaluminum, tri-n-propylaluminum, triisopropylaluminum, tri-n-butylaluminum, tri-sec-butylaluminum, tri-tert-butylaluminum, triisobutylaluminum and the like. The trialkylaluminums are used alone, or as a mixture of one or more thereof.

$TiBr_nCl_{4-n}$, the third component of the polymerization catalyst is used in the range of 0.5 millimole to 15 millimoles, preferably 2 to 10 millimoles per 100 g. of the monomer mixture of 1,3-butadiene and propylene. In a range below 0.5 millimole, polymerization does not occur, and with more than 15 millimoles, the obtained copolymer contains an extremely large amount of the insoluble gel in the solvent. Titanium tetrabromide, titanium tetrachloride, titanium tribromomonochloride, titanium dibromodichloride, titanium monobromotrichloride and the like can be used. This third component is also used alone or as a mixture of more than one.

It is preferable that the three components of the polymerization catalyst in the present invention be present in amounts such that the molar ratio of Al to Ti is in the range of 1.0 to 4.0. If the ratio Al/Ti is below 1.0, polymerization of 1,3-butadiene and propylene is not effected, while if the ratio is more than 4.0, polymerization of propylene does not occur and the desired copolymer cannot be obtained. Moreover, the molar ratio $I_2$/Ti is preferably in the range of 0.5 to 2.0. If the ratio $I_2$/Ti is below 0.5, much insoluble gel is produced, while if the ratio is more than 2.0, the velocity and yield of the polymerization are very low. Moreover, the molecular weight of the copolymer obtained is low.

The solvents employed in the present invention are at least one inert hydrocarbon, especially aliphatic and aromatic hydrocarbons which are liquid at normal temperature. As inert hydrocarbon-solvents, for example, pentane, hexane, heptane, cyclohexane, methylcyclohexane, benzene, toluene, ethylbenzene, xylene, diethylbenzene and the like are used. The amount of solvent is usually 1 to 20 parts by weight, especially 2 to 10 parts by weight per part by weight of the mixture of 1,3-butadiene and propylene.

The temperature of copolymerization is usually 10° C. to 120° C., preferably 20° C. to 100° C. The time necessary for the polymerization reaction depends on the amount of the polymerization catalyst and solvent to the monomer mixture, the temperature of polymerization and other factors. It is usually 1 to 30 hours.

As to the components of the monomer mixture, 3 to 99% by weight of propylene is contained in the mixture of monomers to be copolymerized. The weight percentage of propylene in the obtained copolymer is usually 2 to 80%.

When the amount of propylene contained is below 2%, the excellent physical properties such as processing properties, tensile strength and tear resistance which are characteristics of the copolymer are not realized in the obtained rubbers. The properties of the rubber of the copolymer deteriorate if the content of propylene is more than 80%. As a rubber for general use, the amount of propylene contained in the copolymer is preferably 5 to 60% by weight.

In the polymerization it is necessary to operate under an inert atmosphere, for example, nitrogen or helium. Oxygen should be avoided since it inactivates the copolymerization catalyst, especially the trialkylaluminum. Moreover, substances containing active hydrogen such as water, alcohols, primary or secondary amines and mercaptans should be avoided since they deactivate the polymerization catalyst.

The polymerization catalyst used in the present invention consists of the three components described above. In the case of a lack of one or two of the components, the polymerization cannot be substantially carried out. Even if copolymerization occurs, the polymerization speed is low and further the yield of polymer is too low for practical use, and moreover a large amount of insoluble gel is produced. Namely, a copolymer having high molecular weight can be obtained in high yield only when the polymerization catalyst containing the three components in the appropriate ratio as mentioned above is used in the proper amounts. A copolymer of 1,3-butadiene and propylene to be put to practical use and fulfil the economical demand can be produced according to the process of the present invention. Consequently, a synthetic rubber which is industrially useful can be obtained and it can be easily provided for various purposes.

The copolymerization rubber of 1,3-butadiene and propylene produced by the present invention has processing properties and practical properties of matter which are superior to those of the rubber product obtained from the raw material rubber. They are widely used for tire carcass, tire tread, belt, industrial articles, sponge product, car accessories and so on.

In the case of the production of general rubber products, the copolymer obtained according to the present invention may be used by mixing same with natural rubber, butadiene-styrene rubber, polybutadiene rubber, polyisoprene rubber, chloroprene rubber, butadiene-acrylonitrile rubber, butadiene-methacrylate rubber, ethylene-propylene rubber, etc. It is effective for improving the processing properties and practical properties of matter thereof.

At least 20% of the 1,3-butadiene-propylene copolymer obtained in the present invention should be contained in the raw material rubber. In amounts below 20%, the effect of the processing properties and the physical properties which are the characteristics of the present 1,3-butadiene-propylene-copolymer cannot be expected in the cured rubber product obtained.

The copolymerized rubber produced according to the process of the present invention is put to practical use after compounding with processing oil, carbon black, accelerators, vulcanizing agents, stearic acid, zinc oxide, various kinds of fillers, regenerated rubbers, etc. and then, vulcanizing.

From the point of view of practical properties of matter, the filter is the most important of the various kinds of blending agents. The fillers are roughly divided into the following two groups depending on tthe purpose of the blending.

One of them is chiefly used for improving tthe practical properties of matter of the cured rubber product, especially abrasion resistance, hardness, etc. Various kinds of carbon black which have different particle size or surface construction, powdered silicic anhydride and the like are included in this group.

Another is chiefly used for extender, processing aid, etc. Calcium carbonate, calcium silicate, calcium carbonate coated with an aliphatic acid, magnesium carbonate, magnesium oxide, zinc oxide, titanium oxide, clay, alumina, talc, etc. are included in this group.

The filler to be employed should be used by blending the appropriate compounds selected from these two groups considering from the ultimate use and cost.

The blending amount of the filler should be suitably selected depending on the intended use of the rubber product. A blending amount below 10 parts by weight is not enough from the point of the practical properties of matter of the rubber product and more than 400 parts by weight cause a deterioration in abrasion resistance and resilience.

The fillers mentioned above are mechanically mixed with a Banbury mixer or an open roll. In special cases, they may be used in the state of a master batch of the filler obtained by mixing the filler before the polymerization-solvent is removed in the process for production of the raw material rubber.

As the blending agents employed in the present invention, processing oil is most important after the filler. Generally, the processing oil employed as the blending agent of rubber consists of a substance with high boiling point in the fractionation of petroleum. It is classified as either paraffinic, naphthenic or aromatic oil from the chemical structure of hydrocarbon molecules of oil and they are usually divided according to the Viscosity Gravity Constant (hereinafter abbreviated to V.G.C.).

$$V.G.C. = \frac{G - 0.24 - 0.022 \log (U - 35.5)}{0.755}$$

wherein G is the specific gravity of oil at 60° F. and V is the viscosity of oil at 210° F. by the Seibolt universal standard.

In general, a paraffinic oil has V.G.C. of 0.790 to 0.849, naphthenic oil 0.850 to 0.899 and aromatic oil more than 0.900.

As the processing oil used for the copolymerized rubber of butadiene and propylene containing 2 to 80 percent by weight of propylene, any kinds of processing oil having a V.G.C. of 0.790 to 1.00 may be used and this improves the plasticity and dispersibility of the blending substance, and moreover they can be used in a large amount in order to lower the cost of the blending substance.

The addition amount of the processing oil used in the present invention is 2 to 100 parts by weight per 100 parts of the raw material rubber, preferably 5 to 75 parts. When the addition amount of processing oil is below 2 parts by weight, the dispersion of filler or accelerator becomes poor and when more than 100 parts are used, the cured rubber product obtained is inferior in the properties of matter.

The processing oil employed in the present invention may be simultaneously mechanically mixed with other blending agents by a Banbury mixer, an open roll, etc. It may be used as the oil extending polymer obtained by previously mixing the whole amount or a part of the processing oil added to the copolymerization rubber of butadiene and propylene applied to the present invention or other synthetic rubber simultaneously blended in the state of latex or solution and removing the solvent therefrom. It is superior with respect to processing operation and the practical properties of matter to make the processing oil add to the rubber as the oil-extending polymer beforehand so as to obtain a blending substance containing a large amount of processing oil.

As the blending agents besides the filler or processing oil, tackifiers of rosin, cumarone resin, petroleum resin, etc., accelerators, vulcanizing agents such as sulfur, peroxide, etc., processing assistant such as stearic acid or metal salts thereof, antiozonants agents, waxes and so on are generally employed. These agents are blended in appropriate amounts depending on the use of the product.

A rubber compound consisting of a raw material rubber containing at least 20 percent by weight of the copolymerization rubber of butadiene and propylene with 2 to 80 percent by weight of propylene content has remarkably excellent extrusion properties, roll processing properties, abrasion resistance, dynamic properties, low temperature-persistence and the like of the cured stock. Therefore they are widely usable.

The present invention will be more fully illustrated by referring to the following examples, but these examples do not limit the scope of the present invention which is defined in the appended claims.

EXAMPLE 1

To a 15 percent by weight solution containing 100 g. of a monomer mixture consisting of 50 parts of 1,3-butadiene and 50 parts of propylene in n-hexane, 0.70 part by weight of titanium tetrachloride per 100 parts by weight of the monomer mixture, iodine in an amount of 0.7 times as much as the titanium tetrachloride in moles and triethylaluminum in an amount of 1.7 times as much as the titanium tetrachloride in moles were added and copolymerization was conducted with stirring at 30° C. for 24 hours under a nitrogen atmosphere to obtain 83 g. of a rubbery copolymer of 1,3-butadiene and propylene containing 42 percent by weight of propylene. The thus obtained copolymer had a Mooney viscosity of 53.5 ($ML_{1+4}$ (100° C.) here and hereafter) 65% of 1,4-cis content, 32% of 1,4-trans content and 3% of 1,2-vinyl content (by infrared-red spectrophotometry here and hereafter) as regards the 1,3-butadiene and solvent-insoluble gel was not found.

A comparison test was conducted by use of the polymerization catalyst consisting of two components prepared by eliminating the triethylaluminum the titanium tetrachloride from the three components used above. In this case the copolymer was not produced. Moreover, in case of use of the catalyst consisting of two components without iodine, a copolymer (41% of cis content, 54% of 1,4-trans content and 5% of 1,2-vinyl content as regards the 1,3-butadiene) was produced. A hexane-insoluble gel equivalent to 52 percent by weight of the copolymer produced was simultaneously found. The production of copolymer was not obtained by the use of catalysts containing respectively the three components, i.e., triethylaluminum, iodine or titanium tetrachloride alone.

EXAMPLE 2

To a 20 percent by weight solution containing 100 g. of a monomer mixture consisting of 80 parts of 1,3-butadiene and 20 parts of propylene in n-hexane, 1.00 part by weight of titanium tetrachloride per 100 parts by weight of the monomer mixture, iodine in an amount of 1.0 time again as much as the titanium tetrachloride and triisobutylaluminum in an amount of 20 times as much as the titanium tetrachloride in moles were added and copolymerization was conducted at 50° C. for 15 hours under a nitrogen atmosphere with stirring to obtain 91 g. of a rubbery copolymer of 1,3-butadiene and propylene containing 15 percent by weight of bound propylene. The thus obtained copolymerized rubber had a Mooney viscosity of 43.0, 0.9% of a toluene-insoluble gel, 68% of 1,4-cis content, 30% of 1,4-trans content and 2% of 1,2-vinyl content as regards the 1,3-butadiene.

EXAMPLE 3

To an 18 percent by weight solution containing 60 g. of a monomer mixture consisting of 20 parts of 1,3-butadiene and 80 parts of propylene in n-hexane, 1.2 g. of titanium tetrachloride, iodine in amount of 0.8 times as much as the titanium tetrachloride and triethylaluminum in an amount of 2.3 times as much as the titanium tetrachloride in moles were added. Subsequently, thereto an 18 percent by weight solution containing 40 g. of 1,3-butadiene in n-hexane was successively added at 50° C. within 15 hours, during the reaction, the weight ratio of the monomers in the polymerization system was usually controlled to be 19–21:81–79, while gaschromatographically observing the proceeding of the copolymerization. 93 g. of a rubbery random copolymer of 1,3-butadiene and propylene having 31 percent by weight of bound propylene was obtained by substituting the polymerization system with nitrogen and continuing the copolymerization with stirring. The thus obtained rubber had a Mooney viscosity of 33.0, 0.6% of a toluene-insoluble gel, 66% of 1,4-cis content, 32% of 1,4-trans content and 3% of 1,2-vinyl content as regards the 1,3-butadiene.

EXAMPLE 4

To a 25 percent by weight solution containing 100 g. of a monomer mixture consisting of 85 parts of 1,3-butadiene and 15 parts of propylene by weight in toluene, 1.8 parts by weight of titanium tetrabromide per 100 parts by weight of the monomer mixture, iodine in an amount equivalent to the titanium tetrachloride and triethylaluminum in an amount of 2.0 times as much as the titanium tetrachloride in mole were added and copolymerization was conducted with stirring at 50° C. for 20 hours under a nitrogen atmosphere. 90 g. of a rubbery copolymer of 1,3-butadiene and propylene having 13 percent by weight of bound propylene. The thus obtained copolymer had a Mooney viscosity of 46.5, 1.5% of a toluene-insoluble gel, 68% of 1,4-cis content, 29% of 1,4-trans content and 3% of 1,2-vinyl content as regards the 1,3-butadiene.

EXAMPLE 5

To a 25 percent by weight solution containing 100 g. of a monomer mixture consisting of 30 parts of 1,3-butadiene and 70 parts of propylene in toluene, 2.0 parts by weight of titanium dichlorodibromide per 100 parts by weight of the monomer mixture, iodine in an amount of 1.2 times as much as the titanium dichlorodibromide and triethylaluminum in an amount of 2.5 times as much as the titanium dichlorodibromide in moles were added and copolymerization was conducted with stirring at 50° C. for 24 hours under a nitrogen atmosphere. 93 g. of a rubbery copolymer of 1,3-butadiene and propylene having 62 percent by weight of propylene linkage was obtained. The thus obtained copolymerization rubber had a Mooney viscosity of 37.0, 70% of 1,4-cis content, 28% of 1,4-trans content and 2% of 1,2-vinyl content as regards the 1,3-butadiene and the solvent-insoluble gel was not present.

EXAMPLE 6

To a 20 percent by weight solution containing 50 g. of of monomer mixture consisting of 15 parts of 1,3-butadiene and 85 parts of propylene in benzine 0.7 g. of titanium tetrachloride, 1.0 g. of titanium tetrabromide, iodine in an amount equivalent to both titanium halides and triethylaluminum in an amount of 2.5 times as much as both halides in moles were added. Moreover, a 25 percent by weight solution containing 50 g. of 1,3-butadiene in benzene was intermittently added at 50° C. for 20 hours. During this reaction, the weight ratio of the components of the monomers in the polymerization system was usually controlled so as to be in the range of 1,3-butadiene: propylene=15:85, while gaschromatographically observing the proceeding of the copolymerization. 92 g. of a rubbery random copolymer (A) of 1,3-butadiene and propylene having 32 percent by weight of propylene linkage was obtained by substituting the polymerization system by the nitrogen gas and continuing the copolymerization with stirring. The thus obtained copolymerization rubber had a Mooney viscosity of 33.5, 1.2% of a toluene-insoluble gel, 65% of 1,4-cis content, 32% of 1,4-trans content and 3% of 1,2-vinyl content as regards the 1,3-butadiene.

For comparison polymerization of 1,3-butadiene was conducted by the use of the same catalyst. Polybutadiene (B) having a Mooney viscosity of 35.0, 70% of 1,4-cis content, 26% of 1,4-trans content and 4% of 1,2-vinyl content as regards the butadiene was obtained.

The mill processability in both rubbers were measured. The results are shown in the following Table 1.

TABLE 1.—MILL PROCESSABILITY

| Kind of polymer | Range of temperature of tight banding, ° C. |
|---|---|
| 1,3-butadiene-propylene-copolymer (A) | 120–20 |
| 1,3-butadiene-single polymer (B) | >110 30–20 |

The compounds having the recipes shown in Table 2 were vulcanized at 140° C. for 60 minutes. The properties of the cured stock are shown in Table 3.

TABLE 2.—RECIPE (PART BY WEIGHT)

| | A | B |
|---|---|---|
| SBR-1712 | 82.5 | 82.5 |
| 1,3-butadiene-propylene copolymer (A) | 40 | |
| Polybutadiene (B) | | 40 |
| Aromatic processing oil | 30 | 30 |
| Carbon black HAF | 85 | 85 |
| Sulfur | 2.1 | 2.1 |
| Accelerator CZ [1] | 1.2 | 1.2 |
| Zinc oxide | 4.5 | 4.5 |
| Stearic acid | 2.5 | 2.5 |
| Antioxidant D [2] | 1.2 | 1.2 |

[1] N-cyclohexylbenzothiazolsulfenamide.
[2] Phenyl-β-naphthylamine.

TABLE 3.—PROPERTIES OF CURED STOCK

| | A | B | Test method |
|---|---|---|---|
| Hardness (shore A) | 60 | 56 | ASTM D-676-59T. |
| 300% Modulus (kg./cm.²) | 98 | 96 | ASTM D-412-61T. |
| Elongation at break (percent) | 490 | 450 | ASTM D-412-61T. |
| Tensile strength (kg./cm.²) | 190 | 170 | ASTM D-412-61T. |
| G Tear resistance (kg./cm.²) | 44 | 37 | ASTM D-624-54 (Sample form C). |
| Resilience (percent) | 41 | 40 | ASTM D-1054-55. |

The cured stock containing the 1,3-butadienepropylene-copolymer has excellent physical properties as shown above.

What we claim is:

1. A process for producing a copolymer of 1,3-butadiene and propylene, said process comprising copolymerizing 1,3-butadiene and propylene in the presence of a ternary catalyst consisting of the components: (a) a trialkylaluminum, (b) iodine and (c) a titanium compound of the formula: $TiBr_nCl_{4-n}$, wherein $n$ is an integer from 0 to 4, said components being present in amounts such that the molar ratio of aluminum to titanium is 1–4:1, the molar ratio of iodine to titanium is 0.5–2:1 and the titanium compound is present in an amount of 0.5–15 millimoles per 100 gms. of 1,3-butadiene and propylene.

2. A process according to claim 1, wherein the trialkylaluminum is trimethylaluminum, triethylaluminum, tri-n-propylaluminum, triisopropylaluminum, tri-n-butylaluminum, tri-sec-butylaluminum, tri-tert-butylaluminum or triisobutylaluminum.

3. A process according to claim 1, wherein the titanium compound is titanium tetrabromide, titanium tetrachloride, titanium tribromomonochloride, titanium dibromodichloride or titanium monobromotrichloride.

4. A process according to claim 1, wherein propylene comprises 2 to 80 percent by weight of the copolymer.

5. A process according to claim 1 wherein copolymerizing is effected at a temperature of 10°–120° C. for a period of 1 to 30 hours.

6. A process according to claim 5 wherein the temperature is 20°–100° C.

7. A process according to claim 1 wherein copolymerizing is effected in the presence of an inert aliphatic or aromatic hydrocarbon solvent.

8. A process according to claim 7 wherein the solvent is present in an amount of 1 to 20 parts by weight per part by weight of the 1,3-butadiene and propylene.

References Cited

UNITED STATES PATENTS

| 3,205,205 | 9/1965 | Adams | 260—88.2 |
| 3,205,213 | 9/1965 | Stearns et al. | 260—94.3 |
| 3,317,496 | 5/1967 | Watta et al. | 260—88.2 |

JOSEPH L. SHOFER, Primary Examiner

R. A. GAITHER, Assistant Examiner